United States Patent [19]

Nakamura

[11] Patent Number: 4,692,629

[45] Date of Patent: Sep. 8, 1987

[54] OPTICAL TYPE MEASURING SCANNER

[75] Inventor: Taizo Nakamura, Mitaka, Japan

[73] Assignee: Mitutoyo Mfg., Co., Ltd., Japan

[21] Appl. No.: 742,785

[22] Filed: Jun. 10, 1985

[51] Int. Cl.$^4$ ............................................. G01N 121/86
[52] U.S. Cl. ...................................... 250/560; 250/236; 350/6.8
[58] Field of Search ...................... 250/560, 561, 236; 356/386–387; 350/6.7–6.91

[56] References Cited

U.S. PATENT DOCUMENTS

| | | | |
|---|---|---|---|
| 3,517,202 | 6/1970 | Kennedy | 250/568 |
| 3,668,984 | 6/1972 | Rosin | 354/10 |
| 3,853,406 | 12/1974 | Zanoni | 356/387 |
| 3,961,838 | 6/1976 | Zanoni | 350/6.8 |
| 3,973,833 | 8/1976 | Lawson | 350/481 |
| 4,277,128 | 7/1981 | Kawamura | 350/6.8 |
| 4,318,583 | 3/1982 | Goshima et al. | 350/6.8 |

*Primary Examiner*—David C. Nelms
*Assistant Examiner*—Crystal D. Cooper
*Attorney, Agent, or Firm*—Parkhurst & Oliff

[57] ABSTRACT

In an optical measuring device which comprises a polygonal rotary mirror for reflecting an incident light beam into a rotary scanning light beam, a collimator lens for converting the rotary scanning light beam into a parallel scanning light beam and a light receiving element for detecting bright and dark portions of the parallel scanning light beam, which has scanned a work to be measured, and a time duration of the dark portion or the bright portion is detected, which has been generated by the obstruction of a part of the parallel scanning light beam by the work, to thereby determine a dimension of the work, the collimator lens is made to be an fθ lens having such a spherical aberration that a light beam incident from the outlet side of the collimator lens toward the polygonal rotary mirror in parallel to the optical axis of the lens intersects the optical axis of the lens at a position shifted from a focal point on the inlet side to the outlet side by Δ, on the inlet side, so that the influence on the measuring error due to a relative displacement of the reflecting point of the polygonal rotary mirror can be minimized.

4 Claims, 10 Drawing Figures

OPTICAL TYPE MEASURING SCANNER

BACKGROUND OF THE INVENTION

1. Field of the Invention

This invention relates to an optical type measuring device, and more particularly to improvements in an optical type measuring device, wherein a parallel scanning light beam is utilized to measure dimensions of a workpiece to be measured.

2. Description of the Prior Art

Heretofore, there has been adopted an optical type measuring device wherein a rotary scanning light beam (a laser beam) is converted by a collimator lens into a parallel scanning light beam to be passed through this collimator lens and a condensing lens, a workpiece to be measured is interposed between the collimator lens and the condensing lens, and dimensions of the workpiece to be measured are measured from the time length of a dark portion or a bright portion generated due to the obstruction of the parallel scanning light beam by the workpiece to be measured.

More specifically, as shown in FIG. 1, a laser beam 12 is oscillated from a laser tube 10 toward a stationary mirror 14, the laser beam 12 thus reflected is converted into a rotary scanning light beam 17 by a polygonal rotary mirror 16, the scanning beam 17 is converted into a parallel scanning light beam 20 by a collimator lens 18, a workpiece 24 to be measured interposed between the collimator lens 18 and a condensing lens 22 is scanned at high speed by the parallel scanning light beam 20, and dimensions in the scanning direction (direction Y) of the workpiece 24 to be measured are measured from the time length of a dark portion or a bright portion generated due to the obstruction of the parallel scanning light beam by the workpiece 24 to be measured.

More specifically, the bright and dark portions of the parallel scanning light beam 20 is detected as variations in output voltage of a light receiving element 26 disposed at the focal point of the condensing lens 22. Signals from the light receiving element 26 are fed to a pre-amplifier 28, where they are amplified, and then, fed to a segment selector circuit 30. This segment selector circuit 30 is adapted to generate a voltage V to open a gate circuit 32 only for a time t, during which the workpiece 24 to be measured is scanned, from the output voltage of the light receiving element 26 and feeds the same to the gate circuit 32. A continuous clock pulse CP is fed to this gate circuit 32 from a clock pulse oscillator 34, whereby the gate circuit 32 generates clock pulses P for counting the time t corresponding to the dimensions in the scanning direction, for example, the outer diameter of the workpiece 24 to be measured and feeds the same to a counter circuit 36. Upon counting the clock pulses P, the counter circuit 36 feeds a count signal to a digital indicator 38, where the dimensions in the scanning direciton, i.e., the outer diameter of the workpiece 24 to be measured is digitally indicated.

On the other hand, a synchronous motor 44 is synchronously driven by an output of a synchronous sine wave oscillator 40, which generates sine waves in synchronism with the clock pulse oscillator 34 and a power amplifier 42. So, the synchronous motor 44 rotates the polygonal rotary mirror 16 in synchronism with the continuous clock pulses CP fed from the clock pulse oscillator 34, whereby the measuring accuracy is maintained.

The above-described high speed scanning type laser length measuring device has been widely utilized because the lengths, thickness and the like of moving workpieces and workpieces heated to a high temperature can be measured at high accuracies in non-contact relationship therewith.

However, in the polygonal rotary mirror 16 in the above-described high speed scanning type laser length measuring device, a distance in the scanning direction from the reflecting point 16A to the optical axis 18A of the collimator lens 18 varies periodically during its rotation as enlargedly shown in FIG. 3, such a disadvantage is presented that the measuring accuracy varies.

In contrast thereto, the rotary mirror 16 is formed into a single plane mirror, so that the distance from the reflecting point can be prevented from varying. However, the above-described single plane mirror is limited in the number of cycles of scanning the work to be measured by the laser beam, so that the averaged accuracy of the measured values cannot be improved.

In consequence, in the above-described measuring device, it becomes inevitable to utilize the polygonal rotary mirror.

As shown in FIG. 4, when an angle made by a rotary scanning light beam 17 and the optical axis of the lens is $\theta$, the collimator lens 18 is normally made to be a so-called f lens wherein the light beam exiting from the collimator lens 18 is changed into a parallel scanning light beam 20 having a distance $y = f\theta$ (f is a focal length of the lens) from the optical axis of the lens. In order for the exiting light beam to become parallel to the optical axis of the collimator lens 18 as described above, it is on the assumption that the reflecting point of the laser beam 12 on the polygonal rotary mirror 16 is positioned at a focus $F_1$ on the inlet side of the collimator lens 18.

However, since a distance from the rotary center to the reflecting surface of the polygonal rotary mirror 16 varies periodically as described above, the light beam of the collimator lens 18 on the outlet side is periodically shifted in angle relative to the optical axis of the lens. For this reason, the measuring accuracy varies.

For example, in the case where the diameter $\phi$ of a collimator lens 18 is 30 millimeter, the focal length f is 90 millimeter and a normal distance R from the rotary center to the reflecting surface of the polygonal rotary mirror 16 is 9 millimeter, when a shift of the reflecting point on the incident optical axis is $\Delta$ and an inclination angle of an exiting beam to the optical axis of the lens is $\alpha$, and if errors in measurement are 0.5 micrometer and 1 micrometer, then a measurable range is shown in the following Table 1.

As apparent from this table 1, if a measuring range is determined under a predetermined measuring errors tolerance, then a scanning angle $\theta$ is determined. The size of the work to be measured is determined by an effective diameter of the collimator lens 18, whereby $y = f\theta$ becomes smaller in value than the effective diameter of the lens. In consequence, over a predetermined measuring range, if the scanning angle $\theta$ becomes small, then the focal length f of the collimator lens 18 should be increased. An increased focal length f of the collimator lens 18 disadvantageously result in an increased size of the measuring device.

TABLE 1

| Scanning angle $\theta$ | Beam height $\gamma$ | Shift of reflecting point $\Delta$ | Inclination of beam $\alpha$ | Measuring range | |
|---|---|---|---|---|---|
| | | | | 0.5 μm Tolerance | 1 μm Tolerance |
| 2° | 3.141$_6$ | 1.37 μm | 0.11 sec. | 937.6 | 1875.1 |
| 4° | 6.283$_2$ | 5.49 | 0.88 | 117.4 | 234.8 |
| 6° | 9.424$_8$ | 12.35 | 2.96 | 34.8 | 69.7 |
| 8° | 12.566$_4$ | 21.98 | 7.03 | 14.7 | 29.3 |
| 9.5° | 14.922$_6$ | 31.02 | 11.79 | 8.7 | 17.5 |

SUMMARY OF THE INVENTION

The present invention has been developed to obviate the above-described disadvantages of the prior art and has as its object the provision of an optical measuring device wherein an influence on the measuring error exerted by a relative displacement of the reflecting point of the polygonal rotary mirror can be reduced to the minimum.

To this end, the present invention contemplates that, in an optical measuring device which comprises a parallel scanning light beam generator including a polygonal rotary mirror for reflecting an incident light beam from a beam generator into a rotary scanning light beam and a collimator lens for converting the rotary scanning light beam into a parallel scanning light beam, and a light receiving element for detecting bright and dark portions of the parallel scanning light beam, which has scanned a work to be measured, and a time duration of the dark portion or the bright portion is detected, which has been generated by the obstruction of a part of the parallel scanning light beam by the work to be measured interposed between the parallel scanning light beam generator and the light receiving element, to thereby determine a dimension of the work to be measured in the scanning direction, when an angle of rotation of a normal line to a reflecting surface of the polygonal rotary mirror with the optical axis of the incident light beam is $\theta/2$ and a distance on the aforesaid normal line between the reflecting surface and the rotary center of the polygonal rotary mirror is R, the aforesaid collimator lens is made to be an $f\theta$ lens having such a spherical aberration that a light beam incident upon the outlet side of the collimator lens and directed toward the polygonal rotary mirror in parallel to the optical axis of the lens intersects the optical axis of the lens at a position shifted from a focal point on the inlet side to the outlet side by $\Delta = R/\cos(\theta/2) - R$, on the inlet side.

Further, according to the present invention, the collimator lens is constituted by three lenses including a first lens, a second lens and a third lens having a negative, a positive and a positive focal lengths from the side of the polygonal rotary mirror, respectively, so that a necessary lens performance can be obtained by a simplified structure.

Furthermore, according to the present invention, the incident optical axis of the light beam emitted directly or indirectly to the polygonal rotary mirror from the aforesaid beam generator and the optical axis of the collimator lens for converting the rotary scanning light beam of this light beam reflected by the polygonal rotary mirror into the parallel scanning light beam are arranged to intersect each other at angles equal to each other from opposing directions with respect to a rotary plane perpendicular to a rotary center axis of the polygonal rotary mirror, whereby an influence of a relative displacement of the reflecting point on the polygonal rotary mirror is represented as a variation in a direction perpendicular to the scanning direction of the rotary scanning light beam and the parallel scanning light beam, so that the measuring error may be reduced.

Additionally, according to the present invention, the incident optical axis and the optical axis of the collimator lens are arranged to intersect the aforesaid rotary plane perpendicularly and disposed in one and the same plane incorporating the aforesaid rotary center axis, whereby the influence due to the relative displacement of the reflecting point on the polygonal rotary mirror appears in the largest scale in a direction perpendicular to the scanning direction, so that the measuring error may be minimized.

In consequence, according to the present invention, a variation in the incident angle of the light beam incident upon the collimator lens due to a variation in the distance of the reflecting surface in the direction of the optical axis is absorbed by the spherical aberration of the collimator lens, so that the light beam exiting from the collimator lens can be constantly in parallel to the optical axis of the lens regardless of the variation in the distance from the reflecting point. With this arrangement, the influence of the variation in the relative distance between the reflecting point of the light beam on the polygonal rotary mirror and the collimator lens to the measuring error can be considerably reduced by use of a simplified structure.

BRIEF DESCRIPTION OF THE DRAWINGS

The exact nature of this invention, as well as other objects and advantages thereof, will be apparent from consideration of the following specification relating to the accompanying drawings, in which like reference characters designate the same or similar parts throughout the figures thereof and wherein.

DETAILED DESCRIPTION OF THE PREFERRED EMBODIMENT

Figure 1:
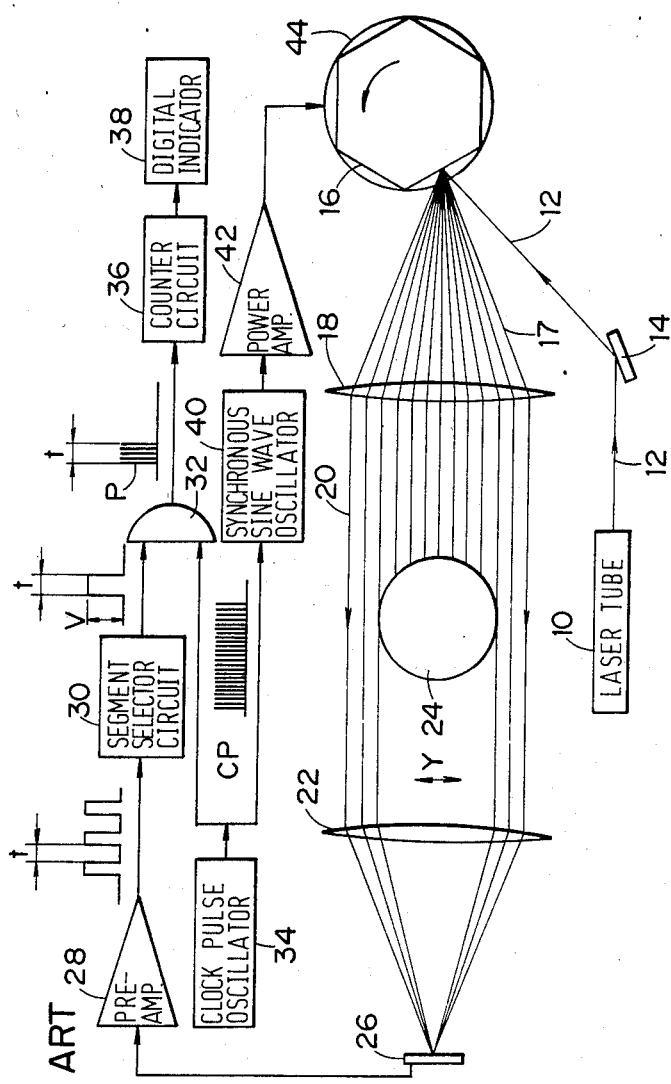
FIG. 1 is a block diagram showing the conventional optical measuring device.

Description will hereunder be given of one embodiment of the present invention with reference to the drawings. Here, in this embodiment, the portions or members same as or corresponding to those of the conventional optical measuring device shown in FIG. 1 are depicted by the same reference numerals as the latter to avoid doubled description.

As shown in FIGS. 5 through 9, according to this embodiment, in the optical measuring device similar to the one shown in FIG. 1, when an angle of rotation of a normal line 46A to the reflecting surface 46 of the polygonal rotary mirror 16 with the optical axis of the incident light beam 12 is $\theta/2$ and a distance on the aforesaid normal line 46A between the reflecting surface 46 and the rotary center 48 of the polygonal rotary mirror 16 is R, the aforesaid collimator lens 18 is made to be an $f\theta$ lens having such a spherical aberration that a light beam incident upon the outlet side of the collimator lens 18 directed toward the polygonal rotary mirror 16 in parallel to the optical axis 18A of the lens intersects the optical axis 18A of the lens at a position shifted from a focal point $F_1$ on the inlet side to the outlet side by $\Delta = R/\cos(\theta/2) - R$, on the inlet side.

Figure 7:
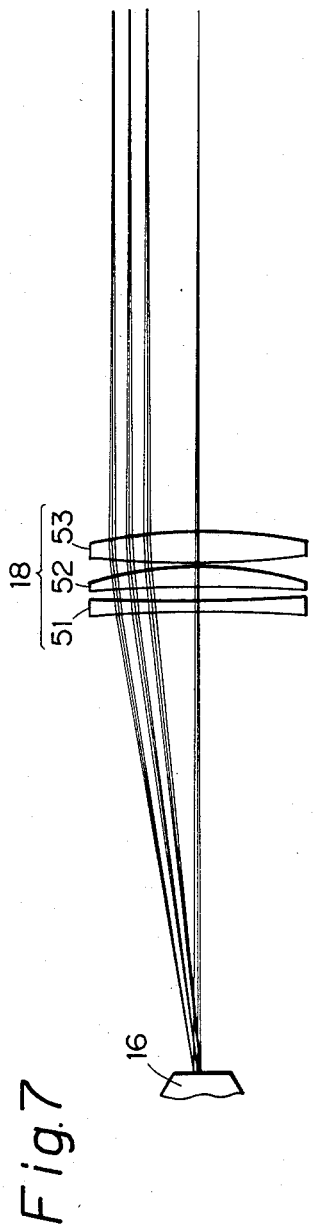
FIG. 7 is a side view showing the collimator lens and the light path thereof in the optical measuring device embodying the present invention.

As shown in FIG. 7, the collimator lens 18 in this embodiment is constituted by three lenses including a first lens 51, a second lens 52 and a third lens 53 having a negative, a positive and a positive focal lengths from the side of the polygonal rotary mirror 16, respectively.

This collimator lens 18 has an angle of scanning $\theta = 9.5°$, the total system's focal length $f = 90$ millimeter and an effective luminous flux $\phi = 30$ millimeter, and the respective focal length of the lenses from the first to the third one are 4.8 plus or minus 0.51, 1.7 plus or minus 0.2 and 1.6 plus or minus 0.2 times of the total system's focal length f, respectively.

Additionally, the following table 2 shows radii of curvature, surface-to-surface intervals and refractive indexes of these three lenses 51 to 53.

Figure 10:
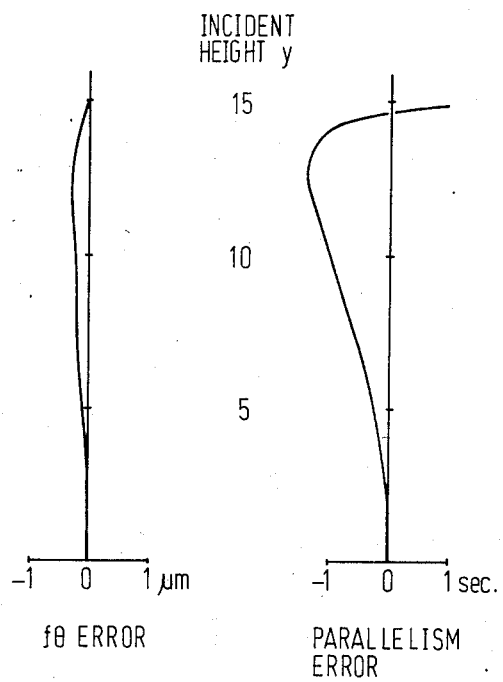
FIG. 10 is a graphic chart showing $f\theta$ error and parallelism error of the light beam exiting from the collimator lens in the above embodiment.

FIGS. 10 (A) and 10 (B) shown $f\theta$ error and parallelism error of the light beam exiting from the collimator lens in this embodiment.

TABLE 2

|  | Radius of curvature | Surface-to-surface interval | Refractive index to wavelength 632.8 nm |
|---|---|---|---|
| First lens | $r_1 = -360$ | $d_1 = 2.7$ | $N_1 = 1.61655$ |
|  | $r_2 = 1004$ | $d_2 = 1.8$ |  |
| Second lens | $r_3 = 297$ | $d_3 = 3.8$ | $N_2 = 1.60102$ |
|  | $r_4 = -70.3$ | $d_4 = 0.7$ |  |
| Third lens | $r_5 = 441.7$ | $d_5 = 5.0$ | $N_3 = 1.63775$ |
|  | $r_6 = -119.6$ |  |  |

Figure 9:
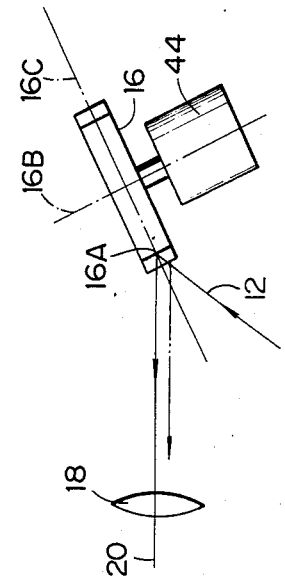
FIG. 9 is a front view thereof.
Figure 8:
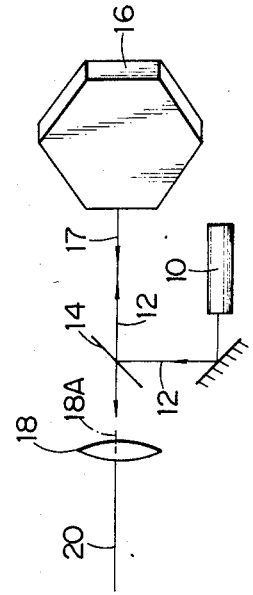
FIG. 8 is a plan view enlargedly showing the essential portions of the optical measuring device embodying the present invention.

Additionally, as shown in FIGS. 8 and 9, in this embodiment, the incident optical axis of the light beam 12 directly or indirectly emitted into the polygonal rotary mirror 16 from a laser tube 10 as being the beam generator and the optical axis 18A of the collimator lens 18 for converting the reflected rotary scanning light beam 17 of this light beam 12 by the polygonal rotary mirror 16 into the parallel scanning light beam 20 are arranged to intersect each other at angles equal to each other from opposing directions with respect to a rotary plane 16C perpendicular to a rotary center axis 16B of the polygonal rotary mirror 16.

Figure 2:
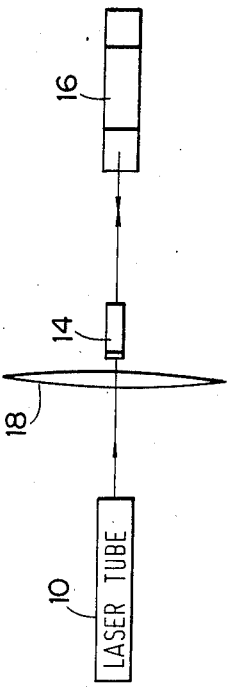
FIG. 2 is a front view thereof.
Figure 3:
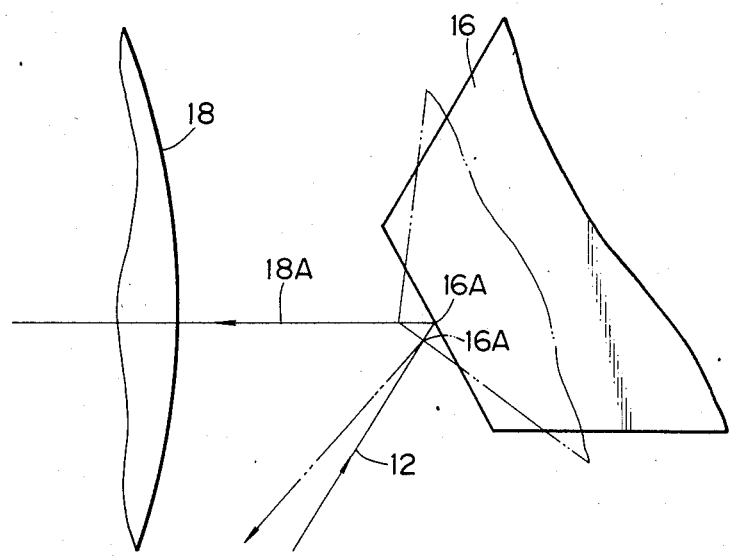
FIG. 3 is a plan view enlargedly showing the relationship between the polygonal rotary mirror, the incident optical axis thereof and the collimator lens in the conventional optical measuring device.
Figure 4:
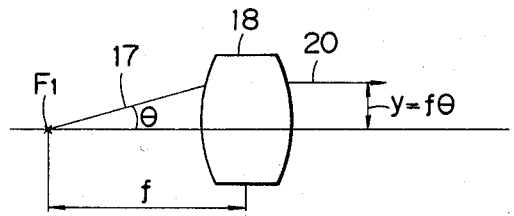
FIG. 4 is a drawing of a light path showing the action of the ordinary $f\theta$ lens.

More specifically, the optical axis of the collimator lens 18 and the incident optical axis from a stationary mirror 14, both of which have heretofore been arranged in the rotary plane of the polygonal rotary mirror 16 as shown in FIG. 2, are arranged in the directions different from each other (from above and from below in FIG. 9) with respect to the rotary plane 16C.

In this embodiment, the stationary mirror 14 for reflecting the laser beam 12 emitted from the laser tube 10 is disposed downwardly of the rotary plane 16C in the drawing and the collimator lens 18 is disposed upwardly of the rotary plane 16C, respectively, and the aforesaid incident optical axis and the optical axis of the collimator lens 18 are arranged to intersect the rotary plane 16C and disposed in one and the same plane incorporating the rotary center axis 16B.

Figure 5:
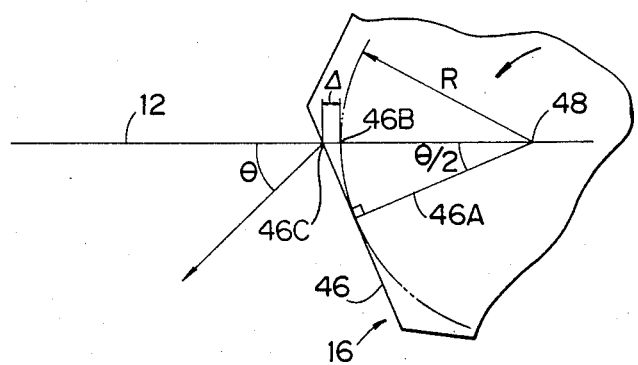
FIG. 5 is a drawing of a light path showing the relationship between the angle of rotation and the variation of the reflecting point of the polygonal rotary mirror.
Figure 6:
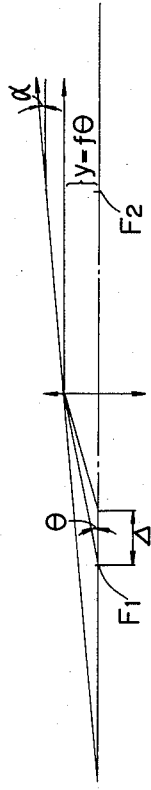
FIG. 6 is a drawing of a light path showing the relationship between the variation of the reflecting point of the polygonal rotary mirror and the inclination angle of the light beam exiting from the collimator lens.

In consequence, in this embodiment, the distances to the reflecting point 16A from the stationary mirror 14 and the collimator lens 18 are varied periodically by the rotation of the polygonal rotary mirror 16. However, as shown in FIG. 5, the influences due to the variations principally appear in directions (in the vertical directions in the drawing) perpendicular to the scanning direction of the rotary scanning light beam 17 and the parallel scanning light beam 20, so that the measuring error is considerably reduced.

In this case, even if the parallel scanning light beam 20 varies in the vertical direction, the work 24 to be measured is scanned and measured in a direction perpendicular to this variation, so that no influence occurs due to the variation in the vertical direction.

Additionally, in the above embodiment, the incident optical axis of the laser beam 12 into the polygonal rotary mirror 16 and the optical axis 18A of the collimator lens 18 have been arranged in the plane perpendicularly intersecting the rotary plane 16C and incorporating the rotary center axis 16B, however, the present invention need not necessarily be limited to this, and such a case may be included that a plane incorporating the incident optical axis and the optical axis of the collimator lens 18 intersects the rotary plane 16C at an angle smaller than 90° (excluding 0°).

Notwithstanding, when the incident optical axis and the optical axis 18A are arranged in a plane perpendicularly intersecting the rotary plane 16C, the influence of the intersection due to the relative displacement of the reflecting point 16A of the polygonal rotary mirror 16 appears in the largest scale in the direction perpendicular to the scanning direction. Hence, the measuring error in this case is the least.

Furthermore, in the above embodiment, the incident optical axis of the light beam 12 and the optical axis 18A of the collimator lens 18 are arranged to intersect at the angles equal to each other from opposing directions with respect to the rotary plane 16C of the polygonal rotary mirror 16, whereby the variation in the distance of the reflecting surface 46 of the polygonal rotary mirror 16 in the direction of the optical axis of the lens is reduced, and moreover, the variation in the distance of the reflecting surface in the direction of the optical axis of the lens is absorbed by the spherical aberration of the collimator lens 18. However, when the variation in the distance of the reflecting surface of the polygonal rotary mirror 16 in the direction of the optical axis of the lens can be absorbed only by the spherical aberration of the collimator lens 18, it is not necessary that the incident optical axis of the light beam 12 and the optical axis 18A of the collimator lens 18 are arranged to intersect each other at the angles equal to each other from the opposing directions with respect to the rotary plane 16C.

Furthermore, the collimator lens 18 in the above embodiment has been constituted by the three lenses 51, 52 and 53 of the specifications as shown in Table 2, however, the present invention need not necessarily be limited to this, the number of constituent lenses, the focal lengths and the like of the collimator lens may be optional only if the collimator lens has a spherical aberration which can absorb the variation in the distance of the reflecting surface of the polygonal rotary mirror 16 in the direction of the optical axis of the lens.

What is claimed is:

1. An optical measuring device wherein:

said device comprises a parallel scanning light beam generator including a polygonal rotary mirror for reflecting an incident light beam from a beam generator into a rotary scanning light beam and a collimator lens for converting said rotary scanning light beam into a parallel scanning light beam, said rotary scanning light beam being incident upon an inlet side of the collimator lens and said parallel scanning light beam exiting from an outlet side of the collimator lens, said collimator lens having a focal point between said inlet side and said polygonal rotary mirror for light passing through said collimator lens from the inlet side to the outlet side, and a light receiving element for detecting bright and dark portions of said parallel scanning light beam, which was scanned a work to be measured, and a time duration of the dark portion or the bright portion is detected, which has been generated by the obstruction of a part of said parallel scanning light beam by said work to be measured interposed between said parallel scanning light beam generator and said light receiving element, to thereby determine a dimension of said work to be measured in the scanning direction;

characterized in that when $\theta/2$ is an angle of rotation between a normal line to a reflecting surface of said polygonal rotary mirror and an optical axis of the incident light beam and R is a distance on said normal line between the reflecting surface and a rotary center of said polygonal rotary mirror, said collimator lens is an $f\theta$ lens having a spherical aberration such that a light beam incident upon the outlet side of said collimator lens and directed toward said polygonal rotary mirror parallel to an optical axis of said collimator lens intersects the optical axis of said collimator lens at a position shifted from said focal point an amount $\Delta$, wherein $\Delta = R/\cos(\theta/2) - R$.

2. An optical measuring device as set forth in claim 1, wherein said collimator lens is constituted by three lenses including a first lens, a second lens and a third lens having a negative, a positive and a positive focal lengths from the side of said polygonal rotary mirror, respectively, said first lens comprising the inlet side of the collimator lens, said third lens comprising the outlet side of the collimator lens and said second lens being positioned between the first and third lenses.

3. An optical measuring device as set forth in claim 1, wherein the optical axis of the incident light beam emitted directly or indirectly to said polygonal rotary mirror from said beam generator and the optical axis of said collimator lens for converting the rotary scanning light beam of said light beam reflected by said polygonal rotary mirror into said parallel scanning light beam are arranged to intersect each other at angles equal to each other from opposing directions with respect to a rotary plane perpendicular to a rotary center axis of said polygonal rotary mirror.

4. An optical measuring device as set forth in claim 1, wherein the optical axis of said incident light beam and the optical axis of said collimator lens are arranged to intersect a rotary plane perpendicularly and are disposed in a common plane which contains a rotary center axis of said polygonal rotary mirror.

* * * * *